United States Patent [19]

Brown, Jr.

[11] 4,420,018

[45] Dec. 13, 1983

[54] POLYPHASE BRAID REINFORCED HOSE

[76] Inventor: Thomas C. Brown, Jr., 492 Hodges Dr., Orangeburg, S.C. 29115

[21] Appl. No.: 372,612

[22] Filed: Apr. 28, 1982

[51] Int. Cl.$^3$ ............................................. F16L 11/00
[52] U.S. Cl. ........................................... 138/124; 87/9
[58] Field of Search ...................... 87/9; 138/123, 124, 138/125, 126, 127, 153, 174, 137

[56] References Cited

U.S. PATENT DOCUMENTS

| 1,014,918 | 1/1912 | Subers | 138/126 X |
| 1,017,271 | 2/1912 | Subers | 138/129 X |
| 1,566,512 | 12/1925 | Subers | 138/137 X |
| 2,438,146 | 3/1948 | Candee et al. | 138/127 X |
| 3,420,276 | 1/1969 | Skinner et al. | 138/127 |
| 3,463,197 | 8/1969 | Slade | 138/125 |

Primary Examiner—James E. Bryant, III
Assistant Examiner—Mark Thronson
Attorney, Agent, or Firm—Dority & Flint

[57] ABSTRACT

A reinforced hose structure is illustrated as including a length of tubing 20 having a first course A of reinforcement braided about the tubing and comprising a conventional braided structure and a second course B of reinforcement braided about the tubing and about the said first course and comprising a conventional braided structure. First course A includes a first group 10 of reinforcing strands applied about the tube in a first helical direction and a second group 12 of reinforcing strands applied concurrently about the tube in a second, helically opposite direction in such a manner as to interlace the strands of the said two groups into a conventional braided structure. Adjacent windings 10, 12 of the first and second groups are spaced apart to provide widened braid spaces which reduce crimping of the edge wires in each group as the groups of wires intersect each other. A plurality of empty unoccupied spaces C are formed in braided course A along the length of the tube. Spaces C are distinct definite spaces as compared to the non-distinct small interstices associated with the interlacing of conventional braided hoses. Second course B of reinforcement includes a third group 14 of reinforcing wires, and a fourth group 16 of reinforcing wires applied concurrently in helically opposite directions about the first course A. The third and fourth groups of wires form a conventional braided structure which generally covers the empty spaces C in the first course.

7 Claims, 6 Drawing Figures

POLYPHASE BRAID REINFORCED HOSE

BACKGROUND OF THE INVENTION

The present invention relates generally to reinforced hydraulic hoses and, more particularly, to hoses which are reinforced with a braided construction.

Heretofore, braided hydraulic hoses have been provided with the reinforcing element being strands of wires braided about the hose tube such as in the illustrations of prior art contained in U.S. Pat. No. 3,463,197 (FIGS. 2A and 3A). The reinforcing element serves to withstand the forces of pressure within the hose and the tube serves to seal the spaces between the strands and the wires of the strands against leakage of the fluid from within the hose. In this construction interstices occur between the braided strands creating open areas in the reinforcement pattern and limiting the maximum operating pressure of the hose. In an attempt to reduce the area of the interstices, and to increase the degree of reinforcement, strands containing more wires have been utilized. However, adding wires to the strands results in more severe crimping of the edge wires in the criss-crossing strands causing the edge wires to rub and to wear more severely under repeated flexing and pressure impulses in the hose. This often results in overstressing and fatigue breakage of the edge wires leading to complete hose failure.

In order to avoid crimping and the resultant wear and breakage problem, to fill up the interstice space, and to increase the degree of reinforcement, utilization of strands composed of a larger number of smaller diameter wires bunched on top of each other in a mound configuration has been proposed in U.S. Pat. No. 3,463,197. While this unconventional construction provides a satisfactory hose, much of the wire utilized in the construction may not be necessary from the strength standpoint. Many lightly stressed underlying wires simply support the wires which are highly stressed in order to reduce crimping and overstressing of the highly stressed wires.

In conventional braided hose reinforcement, all strands are generally flat and each strand follows a twisting, undulating path within the braid pattern travelling over and under the crossing strands. When the strand width exceeds approximately one half the available strand space as wound along the tube, the undulations of the edge wires become greater than the undulations of the central wires resulting in a longer path for the edge wires. The degree of difference between the lengths of the paths of the edge wires and the central wires is determined by the severity of crimping which results as more wires are added to the strand and are forced into path of greater undulations and greater lengths. All wires of the strand are presented to the braid pattern in relatively equal lengths but the edge wires are used up faster in conventional high pressure hoses because their paths are longer and the central wires then tend to slacken. Since the strand is applied under tension, the edge wires see much more than their proportionate share of this tension and the central wires see much less than their share. Likewise, when the hose is pressurized, the edge wires see more than their proportionate share of the operating stresses and the central wires see less than their share. This means the hose cannot be utilized at full strength as would be the case if all wires in the strand were applied at equal tensions and equal lengths and, therefore, more equally shared the stresses of operation.

As the edge wires get tighter and the central wires get looser there is a natural tendency for these wires to seek an equilibrium state by exchanging places. This phenomenon of the central wire crossing above the other wires into the edge position and the other wires moving toward the strand center is practically referred to as a cross-over by the hose industry. Cross-overs have long been felt by the hose industry to be a main point of weakness in a hose and a major cause of hose failure in operation.

Sometimes the cross-over does not occur and the central wire becomes so loose that it entangles in part of the braiding machine and breaks. This causes stopping of the machine and scrapping of the affected length of hose and results in loss of production and in labor expenditure to reconnect the broken wire.

Generally, very high strand application tensions are utilized in braiding high pressure hoses in order to effect the tight crimping of the edge wires and in an attempt to reduce cross-overs and slackness in the central wires. The idea is that, since the slack central wires cannot be shortened, the edge wires must be stretched by high tension so they more nearly equal the length of the central wires. This dictates the use of very strong tube materials, which are expensive, capable of withstanding the high strand tension without deforming or extruding through the braided strands. Also in many cases it is necessary to freeze the tube material to make it hard enough to withstand the strand application tension. Again this is an added expense to the manufacture of the hose.

Furthermore, in the prior attempts to increase the number of wires in each strand in order to reduce the area of the interstices, a bunching effect occurs in which the outermost wires of each strand move in towards the center of the strand displacing the central wires. This opens up the interstices, increasing their areas and reducing the areas of proper reinforcement, and results in an unacceptable hose. This bunching effect occurs in braiding of hoses utilizing strands composed of more than about ten or twelve wires and where the strand is intended to fill more than about eighty percent of the available strand space. Therefore, in conventional high pressure braided hose construction, the hose size dictates the minimum number of strands utilized for its manufacture; larger hoses require more strands and larger braiding mmachines to accommodate the additional strand containers. Increasing the number of strands increases the number of crimp points magnifying the chance of a failure. The larger machines are naturally mmore expensive, produce hose at a slower rate, and require considerable space in the manufacturing plant. The physical size of braiding machines available today results in a limit of about four inches diameter for conventionally constructed high pressure hoses. Hoses of greater size may be made by less desirable methods than braiding and generally do not have as good performance capability or low cost as would a braided hose.

Multiple layers of braided wire have also been utilized to reinforce hydraulic hoses to provide increased strength to the hose. While these hoses have slightly greater pressure capacity, they still basically have the same problems and weaknesses as the single layer reinforcement pattern. The multiple layer hoses are made by passing the hose tube through a series of braider decks where one braided layer is wrapped upon the other usually with an interlayer of rubber between the layers. Successive layers lie farther from the hose axis and therefore, in order to maintain the optimum braid angle at approximately 54 degrees 44 minutes in each layer of the multiple layer constructions, the pitch of the braid's helix is made different for the different braiding decks corresponding to its respective layer's distance from the hose axis so that the braid angle will be approximately the same or about 54 degrees 44 minutes for each braid layer.

Other reinforcement patterns have been utilized for hydraulic hose such as spiral wrapped hose whereby all the wires of a layer are applied in the same helical direction and the wires of successive layers are applied in alternating helical directions. While this eliminates the crimping problem, affords a greater degree of reinforcement, and provides for more equal sharing of the operating stresses among the wires, the hose is not entirely satisfactory for applications where the hose need be highly flexible in operation. Expensive and difficult to make, the spiral wrap reinforced hose also creates problems in retaining the couplings on the hose because no interlocking occurs between the overlapping spiral layers as occurs in braiding. Interlocking of the criss-crossing braid strands prevents unwinding of the strands and helps prevent the coupling from being forced from the end of the hose when the hose is pressurized.

Accordingly, an important object of the present invention is to provide a braid-reinforced hose construction in which crimping is reduced thereby reducing excessive stress on the edge wires.

Another important object of the present invention is to provide a braid reinforced hydraulic hose which has greater coverage of the reinforcing elements or material than can be achieved in conventional braid reinforced hose construction and which, at the same time, reduces the crimping effect.

Still another important object of the present invention is to provide a reinforced hydraulic hose having a braided construction in which increased coverage of the reinforcement pattern occurs without causing bunching of the wires in the strands and without utilizing unstressed wires.

Still another important object of the present invention is to provide a reinforced hydraulic hose having a braided construction in which all wires of a strand are applied at nearly equal tensions and along paths of nearly equal lengths.

Still another important object of the present invention is to provide a reinforced hydraulic hose having a braided construction in which the tension of application of the strands is reduced, permitting the use of softer tube materials and reducing the need for freezing of the tubes.

Still another important object of the present invention is to provide a reinforced hydraulic hose having a braided construction in which all wires of a strand are nearly equally stressed when the hose is pressurized to permit higher operating pressures than conventional hoses and to extend the service life of the hose.

Still another important object of the present invention is to enable braiding of flat strands composed of more wires than is normally possible with conventional constructions.

Still another important object of the present invention is to provide higher coverage without reducing flexibility of the hose or to provide equal coverage while increasing flexibility.

Yet another important object of the present invention is to provide higher coverage while maintaining interlocking of the strands to effect proper coupling retention.

SUMMARY OF THE INVENTION

The above objectives are accomplished according to the present invention by braiding a first course of flat strands of width no greater than one-half the available strand space and thus defining an open space between adjacent windings into which one or more subsequent courses of flat strands are braided, at the same helical pitch as the first course, by one or more adjustably synchronized, sequential braiding decks. This construction results in a braided reinfocement in which there is no crimping, crossing over or bunching of wires within strands of the individual courses because the low coverage factor of each course causes all wires of a strand to have the same length of path. The strands within each course are interlocked as with conventional braids, however, an even greater degree of interlocking is achieved in this construction due to strands passing over and between strands of previous courses. This additional interlocking is primarily in the axial direction which improves coupling retention capability and which causes no crimping between strands of subsequent courses. Elimination of crimping permits each strand to fill up to one hundred percent of its desired proportion of the total available space without inducing excessive stresses in adjacent wires and thus maintaining a high degree of flexibility.

Since their path lengths are equal, each wire of the strand is applied at nearly equal lengths and tensions, resulting in more equal sharing of forces when the hose is pressurized than is the case of hoses with conventional reinforcement. Since the path length is equal for each wire in a strand, there is need for only a minimum amount of application tension which permits use of softer tubes, may eliminate need for freezing of tubes in some cases, and reduces forces on the braiding machine and associated other equipment.

In addition to accomplishing the desired objectives, this construction also allows hoses of large diameter and/or long length to be braid reinforced on small, fast, readily available braiding machines since each strand can be proportioned along normal constraints and then the needed number of braiding machines to accommodate the required number of strands can be arranged in series.

BRIEF DESCRIPTION OF THE DRAWINGS

The construction designed to carry out the inventin will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The invention relates to the construction of a reinforced hose of the type which is normally utilized for conveying high pressure fluids such as in the case of hydraulic and pneumatic hoses. In particular, the inventin relates to a hose which is reinforced with one or more layers of two or more courses of braided groups of reinforcing strands.

Figure 1:
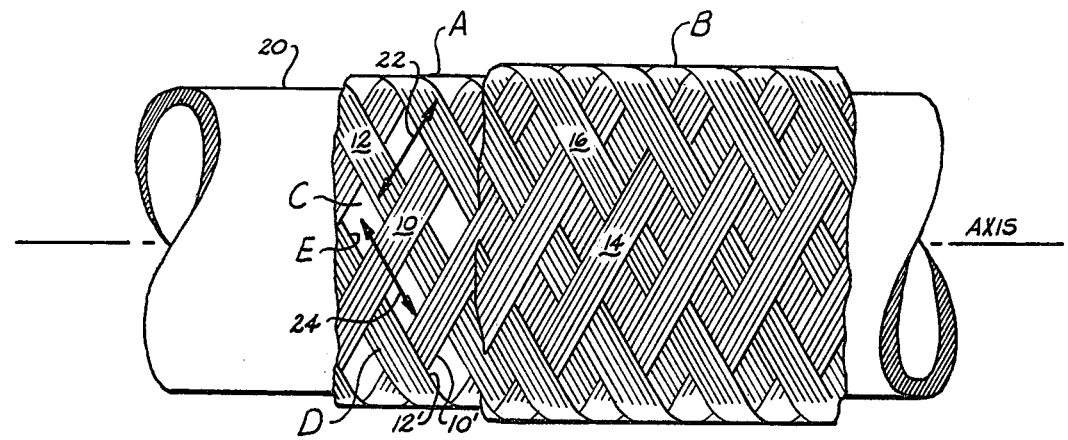
FIG. 1 is an elevation view illustrating a longitudinal length of hose tubing reinforced according to the present invention.
Figure 2:
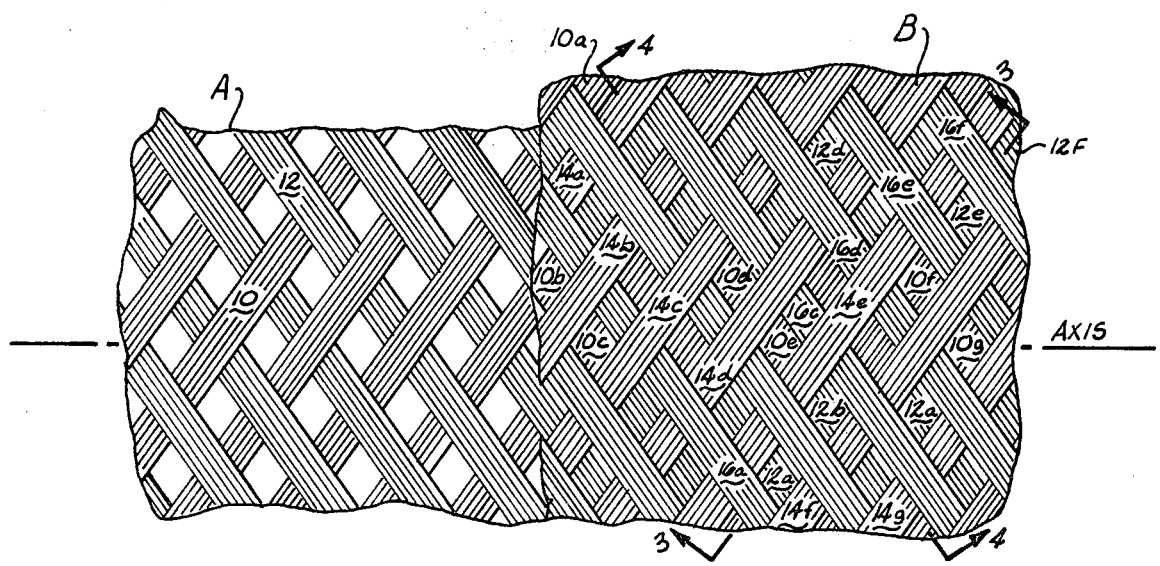
FIG. 2 is an enlarged view illustrating the reinforcement method and construction according to the invention as taken from FIG. 1.
Figure 3:
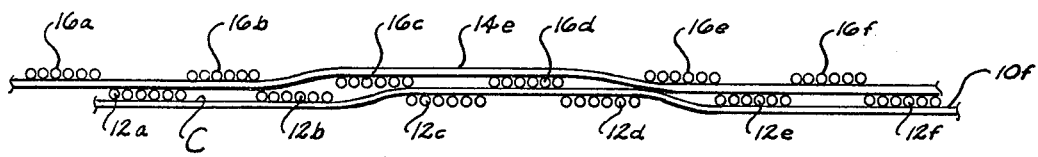
FIG. 3 is a sectional view taken along line 3—3 of FIG. 2.
Figure 4:
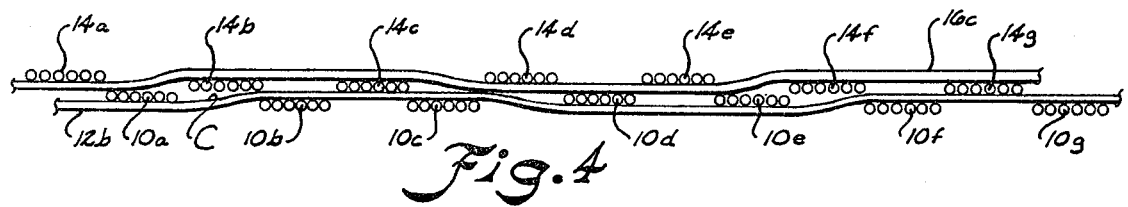
FIG. 4 is a sectional view taken along line 4—4 of FIG. 2.

Referring now in more detail to the drawing, as can best be seen in FIGS. 2 through 4, the braid areinforced method and construction for high pressure hose is illustrated as including a first reinforcement course A having a first group 10 of reinforcing strands applied generally in a clockwise helical direction and a second group 12 of reinforcing strands applied generally in a counterclockwise helical direction wherein the groups 10 and 12 are braided together in a first braided pattern.

The second course B of reinforcement includes a third group of reinforcing strands 14 applied in a generally clockwise helical direction and a fourth group 16 of reinforcing strands applied generally in a counterclockwise helical direction wherein groups 14 and 16 are braided together in a second braided pattern which overlies the first braided pattern of course A. The strands of groups 14 and 16 intersect each other and generally cover empty spaces C of course A.

The term "total available strand space" on the tube member 20 means the space on the exterior of the tube exclusive of any fittings and the like over which the reinforcement strands need be placed on the tube. By braiding courses A and B in two phases, shifted with respect to each other, the second course B is braided upon the first course A such that the groups of reinforcing strands 14 and 16 covering the open spaces C complete coverage of the total available strand space on the tube 20 generally one-hundred percent. Tube 20 may be natural or synthetic rubber, nylon, polyurethane, Hytrel, Teflon, or other suitable material.

The group 10 of reinforcing strands is applied about the tube such that a predetermined lane 22 is created between adjacent runs or windings of the group 10 of strands extending in the direction of the illustrated arrows. The group 12 of reinforcing strands is applied about the tube 20 such that a predetermined lane 24 is created between adjacent runs of the group 12 of strands extending as illustrated by arrows. Open spaces C are thus created in the lanes 22 and 24 between the crossing adjacent runs of groups 10 and 12 and alternate along the lanes with coverings of the runs. The strands of groups 10 and 12 are preferably applied at the same pitch and helical angle, a, which is approximately 54 degrees, 44 minutes.

It will be noted that course B is braided upon lanes 22 and 24 of course A such that the total thicknesses of the two courses lies somewhere between that of conventionally braided one-layer and two-layer constructions.

The width of each group of reinforcing strands 10 through 16 is defined by a generally single layer, flat band of individual strands D having a width defined by the outermost edge of strands or wires E. It is the binding and crimping of these edge wires in the crossover of conventional groups which the present invention seeks to eliminate. Heretofore, the prior art has sought to completely fill the spaces C with reinforcing strands resulting in the binding and crimping of the edge wires such as at the crossing point 10' and 12'. By spacing adjacent runs of the groups 10 and 12 of course A, this extreme binding and crimping of the edge wires as conventionally occurs when the strands are wound under tension is eliminated. The spaces C are then filled by the next course B of reinforcing strands, and the total available strand space on the tube is effectively covered without crimping of the edge wires. The term strand or wire as used herein is meant to include flat and round metallic wires, and yarns of cotton, polyester, fiberglass, rayon, Kevlar, Nylong, or any other fiber or filament used as a reinforcing material.

The crimping of edge wires of the third and fourth groups 14 and 16 of the second course B is likewise reduced by the spacing of adjacent runs of groups 14 and 16 in the same manner as groups 10 and 12. For these purposes, it is required that the groups 10, 12, 14, and 16 be applied at exactly the same helical pitch.

It is to be understood that lanes 22 and 24 and spaces C may be covered by one or more successive courses applied in different phases to produce a polyphase braid reinforcement as referred to herein. For example, course B may be applied to cover only a partial width of each of the lanes 22 and 24 and the spaces C. A third course braided in yet a third phase would cover the remaining open width of lanes 22 and 24 and spaces C. In addition, a rubber layer may or may not be applied between any of the adjacent courses in a conventional manner.

The groups 10 and 12 of reinforcing strands are preferably braided together in a conventional two-over and two-under twill pattern. The groups 14 and 16 of the second course B of reinforcement are likewisee preferably braided in a two-over and two-under twill pattern as can best be seen in FIGS. 3 and 4. However, it is to be understood that a one-over and one-under pattern, a three-over and three-under pattern, or other types of braid and other patterns may be utilized without departing from the spirit and scope of the invention.

Reinforcement strands D preferably include one or more small diameter round wires or the like while, it is to be understood, other forms of individual strengthening elements may also be utilized in each or any group.

In more detail, it can be seen that course A includes group 10 which includes runs 10a–10g braided with runs 12a–12f of group 12 in one complete repeat of the braid pattern as illustrated. Course B includes runs 14a–14g braided with runs 16a–16f in one repeat of the braid pattern overlying course A. As can best be seen in the schematic section view of FIGS. 3 and 4, the runs such as 14a–14g of group 14 are applied in lanes 22 adjacent and parallel to the runs of group 10 covering spaces C therein. The runs of group 16, such as 16a–16f, are applied and occupy lanes 24 between the adjacent and parallel runs of group 12 intersecting the runs of group 14 covering space C.

Figure 5:
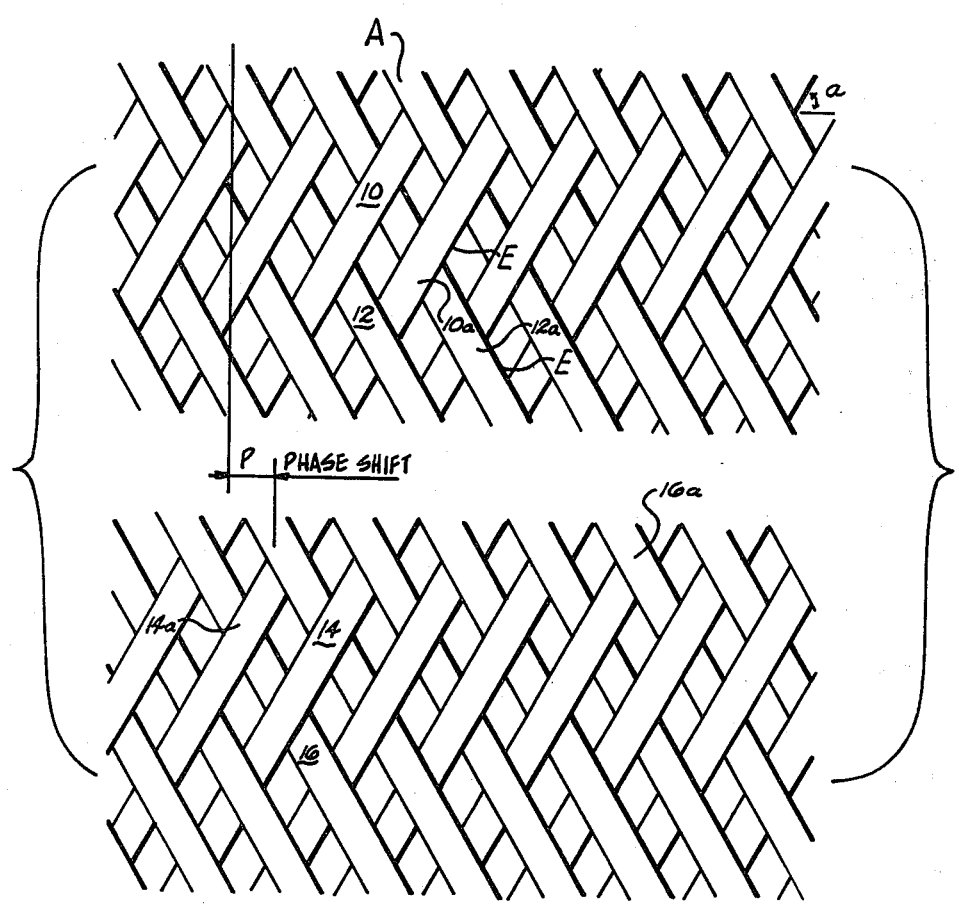
FIG. 5 is a schematic view of the braid reinforcement pattern according to the method and construction of the present invention.

The polyphase construction of the invention is best illustrated in FIG. 5 wherein courses A and B are braided in different phases and are shifted with respect to each other. Course B is braided in a subsequent separate phase shifted in relationship to course A a distance P equal, for example, generally to the width of the first group where the groups are of equal width. For example, the point of lay of run 14a of group 14a is shifted downstream of the run 10a of group 10 by a distance corresponding generally to P so that run 14a is laid adjacent the edge wire E of run 10a. The point of lay of run 16a is shifted downstream a distance P in relation to an adjacent run 12a of group 12 so as to be applied next to the downstream edge wire E thereof.

Figure 6:
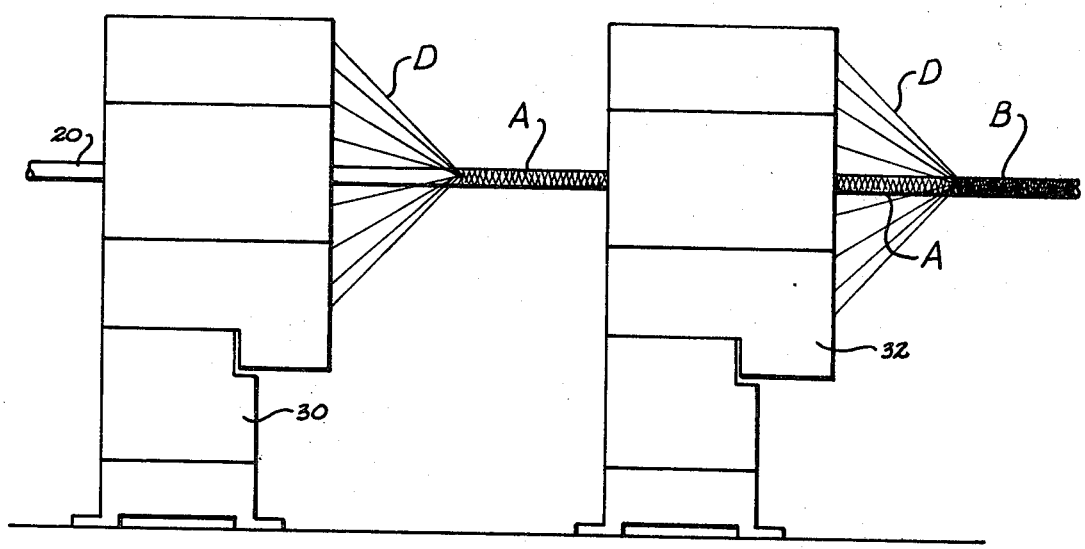
FIG. 6 is a schematic view illustrating apparatus for carrying out the method according to the present invention.

Referring now to FIG. 6, an apparatus is illustrated which may be utilized for constructing a reinforced hose according to the present invention. As illustrated, the apparatus includes a first braiding station 30 through which the tube is passed and a second braiding station 32 which is in series with the first braiding station. The first course A of reinforcement is applied to the tube at the first braiding station 30, and the second course of reinforcement B is applied to the tube and first course A at the second braiding station 32. At each braiding station 30 and 32, a braiding machine preferably is utilized for applying the strands of each course in a braided pattern, such as the two-over and two-under twill pattern illustrated as is well known in the art, such braiding machines as manufactured by Mayer, Rothkopf Industries, Inc. of Orangeburg, S.C. and designated as Model No. MR-11 Braidmatic. Operation of the braiding machines to apply the braided courses of reinforcement to the tube will be well within the purview of one skilled in the art having been taught the method and construction according to the present invention.

Thus, it can be seen that an advantageous construction and method can be had for reinforcing a high pressure hose wherein the reinforcing wires are applied more evenly in tension and length so as to reduce crimping of the edge wires and so that the individual wires in each winding group share the loads and stresses more equally for longer hose life. By applying the winding groups of reinforcing wires in about one-half of the space of conventional reinforcement windings and covering the resulting empty spaces with a second course, the paths of the edge wires and central wires are kept more nearly the same requiring less tension in application during braiding and resulting in more equal load distribution among the wires. Since the windings of crossing groups are spaced more widely apart, the severe crimping found in conventional hose is eliminated while providing more complete coverage of available strand space on the tube. The diameters of reinforced hoses which can be made on conventional braiding machines is limited since the number of wires in each strand or group is limited due to machine capacities. The present invention is not so limited since the groups are applied in successive overlying courses up to ten or more courses. Hoses of twelve inches upwards may be made utilizing eight to twelve wires in a group in accordance with the present invention and longer lengths than heretofore possible may also be made.

While a Preferred embodiment of the invention has been described using specific terms, such description is for illustrative purposes only, and it is to be understood that changes and variations may be made without departing from the spirit or scope of the following claims.

What is claimed is:

1. A tubular braid reinforced hose comprising:
   a tubular member;
   a plurality of courses of braided reinforcing wires covering said tubular member;
   each said course comprising at least two groups of reinforcing wires braided with one another;
   a first of said groups of wires having a helically wrapped orientation in a generally clockwise direction;
   a second of said groups of wires having an opposite helically wrapped orientation in a generally counter-clockwise direction;
   each said group including a plurality of reinforcing wires oriented generally side-by-side defining a generally single layered band having a width defined by outermost edge wires;
   adjacent windings of each of said groups of wires being spaced apart from one another defining crimp reducing braid spaces through which windings of the helically opposite group of wires cross to interlace over and under said adjacent windings of the other of said group of wires in a first braided structure;
   a first underlying course next adjacent said tubular member having first and second groups of wires covering no more than substantially one-half of the available strand space of said tubular member so that adjacent windings define crimp reducing braid spaces having a sufficient width to enable said windings of crossing over groups of wires to undergo less bending when interlaced with said spaced apart adjacent windings and thereby reduce the crimp of edge wires of said adjacent windings crossed thereover;
   said first and second groups of wires of said first underlying course interlaced over and under each other in braided structure defining distinct open unoccupied spaces between adjacent windings of said groups of wires, in which portions of the surface of said tube are substantially exposed;
   a number of overlying braided courses of said first and second groups of wires braided with one another in phase shifted relationship with respect to a next adjacent underlying course so that the wires of said overlying courses substantially occupy the open unoccupied spaces of said first underlying course so that the available wire space on said tubular member is substantially covered by said wires with reduced crimping of said edge wires at points of interlaced windings of said groups;
   said overlying course of groups of wires being applied at a point of lay downstream of corresponding edge wires of said next adjacent underlying course in said phase shifted relationship generally within said space; and
   said overlying course being braided with sufficient tension to enable wire windings of said groups of wires of said overlying courses to fit and interlock in said open unoccupied spaces of said next underlying course providing integral multi-course braided reinforcing fabric structure.

2. The structure of claim 1 wherein the number of wires in each said group is equal for each course.

3. The structure of claim 1 wherein said available wire space on said tubular member is covered equal to or greater than one-hundred percent.

4. The structure of claim 1 wherein the width of said open spaces corresponds generally to the width of said groups of strands.

5. A braid reinforced hydraulic hose structure for conveying a pressurized fluid of the type which includes an inner fluid conveying tube and an outer braid structure reinforcing said tube during pressurization, said hydraulic braided hose structure comprising:
- a first group of reinforcing wires arranged generally side-by-side wound about said inner tube in a first helical direction along said tube, said first group of wires having a width defined by outermost edge wires on opposing sides of said group of wires;
- a second group of reinforcing wires arranged generally side-by-side concurrently wound about said tubing in a second helical direction helically opposite to said first helical direction and interlaced with said first group of wires in a first braided structure; said second group of wires having a width defined by outermost edge wires on opposing sides of said second group;
- edge wire crimping defined by wires of one of said groups of wires intersecting and crossing over the outermost edge wires of windings of the helically opposite wound group of wires and under the next adjacent winding of said helically opposite wound group of wires;
- adjacent windings of said first group of wires being laterally spaced apart from one another to define a first series of open crimp reducing lanes between said adjacent windings spacing adjacent outermost edge strands of adjacent windings apart;
- adjacent windings of said second group of wires being spaced apart from one another to define a second series of open crimp reducing lanes therebetween spacing apart adjacent outermost edge wires of adjacent windings of said second group of wires apart;
- said first and second series of lanes providing crimp reducing braid spaces in which said wires of said first and second groups are braided with one another in said first braided structure, said first and second groups of wires covering no more than substantially one-half of the available strand space on said tube so that said crimp reducing braid spaces have a sufficient width to effectively reduce crimping of said outermost edge wires of one of said groups of wires as the other of said groups crosses thereover and under the next winding of said one group in said first braided structure;
- a plurality of unoccupied spaces formed in said lanes between intersections of adjacent windings of said first and second groups criss-crossing and braided with one another;
- a third group of wires wound about said first braided layer in said first helical direction generally occupying said first series of crimp reducing lanes and having a width generally equal to or less than the width of said first lane;
- a fourth group of wires wound and braided concurrently with said third group of wires generally at the angle and direction of said second helical direction interlaced with said third group of wires in a second braided structure, windings of said fourth group of wires generally occupying said second series of crimp reducing lanes, said fourth group of wires having a width generally equal to or less than the width of said second lane;
- windings of said third and fourth groups of wires of said second braided structure covering said unoccupied spaces of said first braided structure; and
- said third and fourth groups of wires being braided together under sufficient tension such that said third and fourth groups generally fit and interlock into said unoccupied spaces providing integral multi-layer hose structure wherein crimping of edge wires is substantially reduced with increased hose coverage and reinforcement.

6. The structure of claim 5 wherein said first and second groups of said first braided structure are braided in a two-over and two-under twill pattern, said third and fourth groups of said second braided structure being braided in a two-over and two-under twill pattern applied in said lanes and spaces.

7. The structure of claim 5 wherein said third group of reinforcing wires is applied at the same helical pitch as the first group and said fourth group of wires is applied at the same helical pitch as said second group along the length of said tube.

* * * * *